United States Patent [19]
Sakurai

[11] 3,796,897
[45] Mar. 12, 1974

[54] HIGH VOLTAGE GENERATING APPARATUS UTILIZING PIEZOELECTRIC TRANSFORMERS

[75] Inventor: Yasunobu Sakurai, Kawasaki, Japan
[73] Assignee: Denki Onkyo Company, Ltd., Tokyo, Japan
[22] Filed: June 14, 1971
[21] Appl. No.: 152,521

[30] Foreign Application Priority Data
June 16, 1970  Japan.............................. 45-59800

[52] U.S. Cl................................. 310/8.1, 310/9.8
[51] Int. Cl............................................. H04r 17/00
[58] Field of Search ............... 310/8.1, 9.7, 9.8, 9.5, 310/9.6; 321/15, 27 R, 2

[56] References Cited
UNITED STATES PATENTS

| | | | |
|---|---|---|---|
| 3,598,909 | 8/1971 | Sasaki et al...................... | 310/8.1 X |
| 3,562,792 | 2/1971 | Berlincourt...................... | 310/9.8 X |
| 3,562,563 | 2/1971 | Schafft............................. | 310/9.8 X |
| 1,874,563 | 8/1932 | Martin .............................. | 321/15 |
| 2,624,034 | 12/1952 | Gelzer............................... | 321/15 X |
| 2,830,274 | 4/1958 | Rosen et al. ..................... | 310/8.1 X |
| 3,128,421 | 4/1964 | Skellett............................. | 321/15 X |
| 3,292,073 | 12/1966 | Jones et al. ...................... | 321/15 |
| 3,473,039 | 10/1969 | Fegley................................ | 321/2 X |
| 3,533,010 | 10/1970 | Bowles.............................. | 321/15 X |
| 3,551,777 | 12/1970 | Bingley ................................ | 321/2 |

Primary Examiner—J. D. Miller
Assistant Examiner—Mark O. Budd
Attorney, Agent, or Firm—Chittick, Thompson & Pfund

[57] ABSTRACT

In a high voltage generating apparatus comprising a combination of a piezoelectric transformer and a voltage multiplying rectifying circuit connected to the output electrode of the piezoelectric transformer there are provided a pair of independent voltage multiplying rectifying circuits for producing high DC voltages of the opposite polarities.

6 Claims, 3 Drawing Figures

INVENTOR
YASUNOBU SAKURAI

HIGH VOLTAGE GENERATING APPARATUS UTILIZING PIEZOELECTRIC TRANSFORMERS

BACKGROUND OF THE INVENTION

This invention relates to high voltage generating apparatus and more particularly to a circuit for generating high voltages of positive and negative polarities with a single piezoelectric transformer.

In the prior art high voltage generating apparatus utilizing a piezoelectric transformer, in order to generate positive and negative high voltages it is necessary to use two piezoelectric transformers which are connected in parallel for producing positive and negative high voltages respectively. Thus, high voltage generating apparatus capable of simultaneously generating positive and negative voltages requires many circuit elements and hence is bulky.

SUMMARY OF THE INVENTION

It is an object of this invention to provide an improved high voltage generating apparatus capable of simultaneously generating positive and negative voltages by using a single piezoelectric transformer.

Another object of this invention is to provide a new high voltage generating apparatus of compact size comprising a combination of a single piezoelectric transformer and two independent voltage multiplying rectifier circuits and capable of generating positive and negative high voltages.

Still another object of this invention is to provide small and inexpensive high voltage generating apparatus capable of generating both positive and negative voltages and is suitable for use in facsimile machines and the like for forming electrostatic latent images which require continuous instantaneous discharges.

According to this invention there is provided high frequency generating apparatus comprising a piezoelectric transformer including driving electrodes formed on the driving region and at least one output electrode formed on the output region of the piezoelectric transformer and a pair of voltage multiplying rectifying circuits coupled to the output electrode for generating high DC voltages of the opposite polarities. Where the two voltage multiplying rectifying circuits are coupled to the same output electrode, one of the voltage multiplying rectifying circuits is connected to the output electrode of the piezoelectric transformer through a DC blocking capacitor.

BRIEF DESCRIPTION OF THE DRAWING

Further objects and advantages of the invention will become apparent from the following detailed description taken in conjunction with the accompanying drawing in which.

DESCRIPTION OF THE PREFERRED EMBODIMENTS

Figure 1:
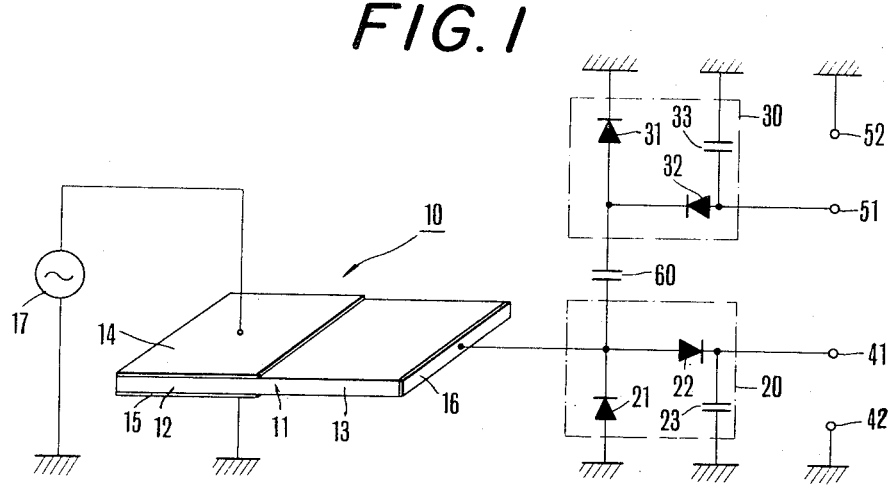
FIG. 1 shows a connection diagram, partly in perspective view, of high voltage generating apparatus embodying the invention.

A preferred embodiment of the invention shown in FIG. 1 comprises a piezoelectric transformer 10 of the well known construction including a rectangular element 11 of lead titanate zirconate, for example. One half of the element 11 is polarized in the direction of thickness and is utilized as the driving region 12 whereas the other half is polarized in the longitudinal direction to form an output region 13. A pair of driving electrodes 14 and 15 are applied on the opposite surfaces of the driving region and an output electrode 16 is secured to the end surface of the output region. A source of alternating current 17 having the same frequency as the fundamental frequency of the mechanical resonance vibration of the piesoelectric element 11 is connected across driving electrodes 14 and 15 to drive the piezoelectric transformer 10. Then, a stepped-up AC voltage appears at the output electrode 16 to which a voltage doubling rectifying circuit 20 is connected comprising diodes 21 and 22 and a smoothing capacitor 23 connected as shown. The cathode electrode of diode 21 and the anode electrode of diode 22 are connected to output electrode 16 whereas the anode electrode of diode 21 is maintained at the same potential as the driving electrode 15 and the cathode electrode of diode 22 is connected to an output terminal 41. One terminal of smoothing capacitor 23 is connected to the cathode electrode of diode 22 and the other terminal is maintained at the same potential as the anode electrode of diode 22 so that the voltage doubling rectifying circuit provides a positive high voltage across the output terminals 41 and 42.

According to this invention another voltage doubling rectifying circuit 30 generating negative high voltage is connected to output electrode 16 through a DC blocking capacitor 60. Similar to voltage doubling rectifying circuit 20, the voltage doubling rectifying circuit 60 also comprises diodes 31 and 32 and a smoothing capacitor 33. However, diodes 31 and 32 are poled oppositely with respect to diodes 21 and 22 so that the circuit 30 produces negative high voltage across its output terminals 51 and 52. The purpose of capacitor 60 is to isolate from each other high voltages having equal positive and negative DC components and to provide an impedance having a value which is negligible when compared with the output impedance of the piezoelectric transformer so that the AC voltage appearing at the output terminal 16 will have a frequency above the audio frequency. When capacitor 60 has an impedance of less than 10 percent of the output impedance of the piezoelectric transformer and has a capacitance of more than 100 pF for the output frequency of 40 to 60 KH$_z$ of the piezoelectric transformer the capacitor 60 does not affect the positive and negative voltages produced. Denoting the output voltages appearing across output terminals 41 and 42 and 51 and 52 by V and — V, respectively, the capacitor 60 must have an insulation breakdown voltage of more than V. The result of experiment shows that, where the output frequency of the piezoelectric transformer ranges from 40 to 60 KH$_z$ and where the voltage doubling rectifying circuits have outputs of ± 3.5 KV and 500 microamperes, respectively, it is sufficient to design capacitor 60 to have a capacitance of 100 pF and an insulation breakdown strength of 5.5 KV.

Figure 3:
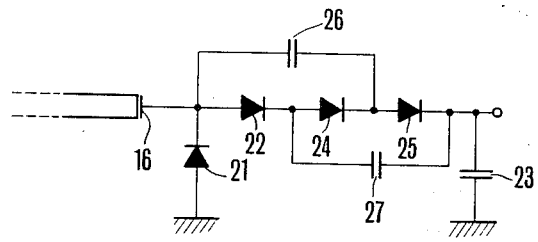

FIG. 3 shows a connection diagram of a voltage quadrupling rectifying circuit. The circuit comprises four diodes 21, 22 24 and 25, two rectifying capacitors 26 and 27 and one smoothing capacitor 23 and operates to produce high positive voltage. A voltage quadrupling rectifying circuit for generating high negative voltage has a similar construction with the exception that the polarities of diodes are reversed with reference to those of diodes 21, 22, 24 and 25. Thus, it is possible to produce positive and negative voltages of four times by replacing circuits 20 and 30 shown in FIG. 1 with positive and negative voltage quadrupling rectifying circuits. In this case, it is sufficient to design capacitor 60 to have a capacitance of 100 pF and an insulation breakdown voltage of 10 KV where the output frequency of piezoelectric transformer 10 ranges from 40 to 60 KH$_z$ and where the outputs of the voltage quadrupling rectifier circuits are ± 7 KV and 500 microamperes. Since the construction and operation of the voltage multiplying circuits utilized in this invention are described in many publications, for example, in "Electronic and Radio Engineering," pp. 707–708, published by McGraw Hill Book Company, 1955, it is believed unnecessary to describe them.

Figure 2:
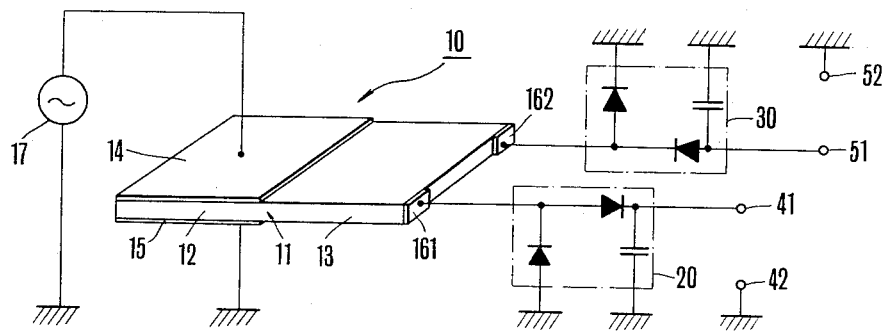
FIG. 2 shows a view similar to FIG. 1 illustrating a modified embodiment of the invention and FIG. 3 shows a connection diagram of a voltage multiplying (four times) rectifying circuit.

In the modified embodiment shown in FIG. 2 two independent spaced apart output electrodes 161 and 162 are formed as far apart as possible on the end surface of the output region 13 of piezoelectric element 11 after the element has been polarized and these output electrode are connected to independent voltage multiplying rectifying circuits. More particularly, a positive voltage doubling rectifying circuit 20 is connected to electrode 161 to receive one-half of the output power of the piezoelectric transformer and a negative voltage doubling rectifying circuit 30 is connected to electrode 162 to receive the other one-half of the output whereby positive high voltage and negative high voltage are produced across output terminals 41 and 42 and 51 and 52, respectively. It is of course possible to use voltage quadrupling rectifying circuits instead of voltage doubling rectifying circuits 20 and 30.

What is claimed is:

1. High voltage generating apparatus comprising a piezoelectric transformer including driving electrodes formed on the driving region and a single AC output electrode formed on the output region of said piezoelectric transformer, a first voltage multiplying rectifying circuit for producing DC output voltage of one polarity relative to a reference potential, the input terminal of said first voltage multiplying rectifying circuit being directly connected to said single output electrode, a second voltage multiplying rectifying circuit for producing DC output voltage of the opposite polarity relative to said reference potential and a DC blocking capacitor connected between said single output electrode and the input terminal of said second voltage multiplying rectifying circuit, the voltage breakdown rating for said blocking capacitor being higher than said DC output voltage of either of said multiplying rectifying circuits.

2. The high voltage generating apparatus according to claim 1 wherein said voltage multiplying rectifying circuits are voltage doubling rectifying circuits.

3. The high voltage generating apparatus according to claim 1 wherein said voltage multiplying rectifying circuits are voltage quadrupling rectifying circuits.

4. The high voltage generating apparatus according to claim 1 wherein said DC blocking capacitor has an impedance that equalizes the output voltages of opposite polarities of said first and second voltage multiplying rectifying circuits.

5. The high voltage generating apparatus according to claim 4 wherein said DC blocking capacitor has an impedance less than about 10% of the output impedance of said piezoelectric transformer.

6. The high voltage generating apparatus according to claim 4 wherein said DC blocking capacitor has a capacitance of more than 100 pF where the output frequency of said piezoelectric transformer equals 40 to 60 KH$_z$.

* * * * *